D. P. STEEPLES.
PARING, SPLITTING, AND CORING KNIFE.
APPLICATION FILED MAR. 3, 1922.

1,431,764. Patented Oct. 10, 1922.

Inventor
Dan P. Steeples

By
Attorney

Patented Oct. 10, 1922.

1,431,764

UNITED STATES PATENT OFFICE.

DANIEL P. STEEPLES, OF SUMNER, WASHINGTON.

PARING, SPLITTING AND CORING KNIFE.

Application filed March 3, 1922. Serial No. 540,775.

*To all whom it may concern:*

Be it known that DANIEL P. STEEPLES, a citizen of the United States of America, residing at Sumner, in the county of Pierce and State of Washington, has invented new and useful Improvements in Paring, Splitting, and Coring Knives, of which the following is a specification.

The object of the invention is to provide a fruit peeling or paring, splitting and coring utensil adapted to perform all the functions incident to the preparation of fruit and particularly of pears and the like for canning or preserving and particularly designed for the use of the operatives in canning factories or canneries while also being suitable for domestic use; and more especially to provide a single tool or utensil capable of performing the several functions incident to the preparation of fruit for canning purposes as a means of avoiding the necessity under the present practice of employing a plurality of devices which must be used alternately or interchangeably in the preparation of the fruit as for example in the paring and splitting and coring and stemming thereof, and hence to avoid the loss of time incident to exchanging implements in the course of the work, and incidentally to provide means for accomplishing the desired purposes whereby facility and accuracy without waste of the fruit may be attained; and with these objects in view the invention consists in a construction and combination of parts of which a preferred embodiment is shown in the accompanying drawings, wherein:—

Figures 1, 2, 3:
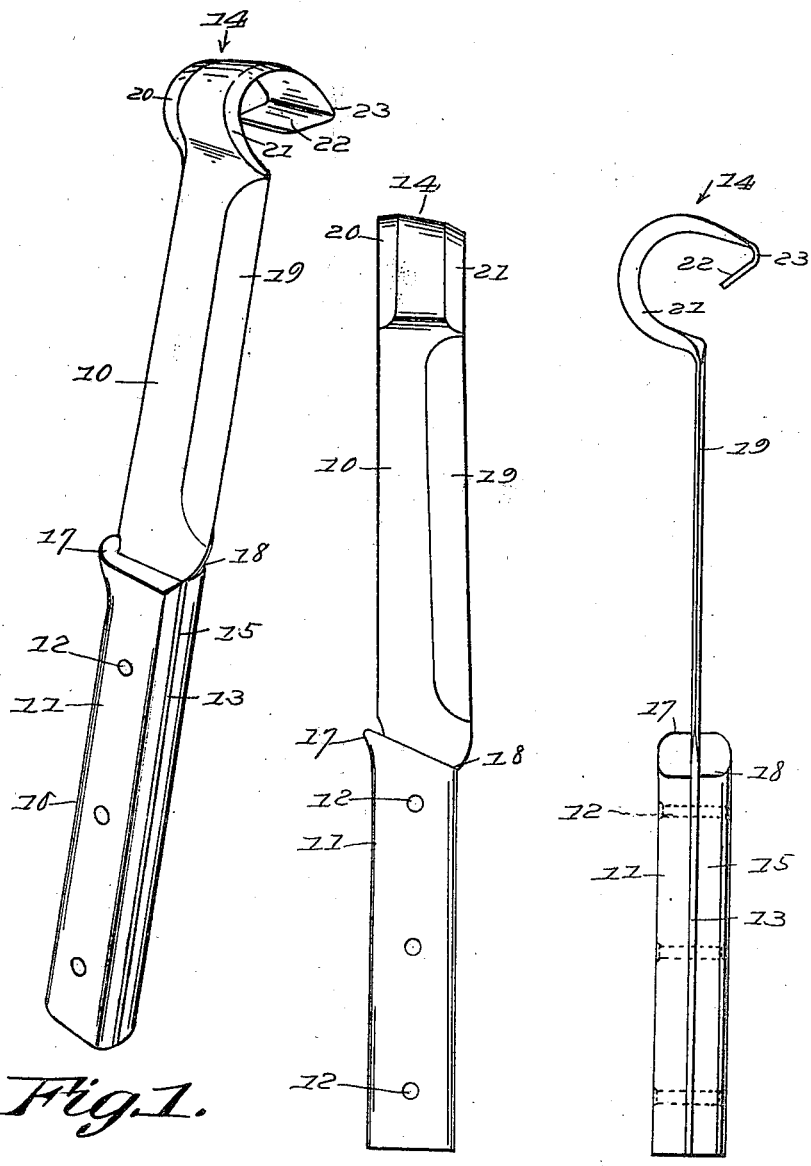
Figure 1 is a perspective view of a fruit preparing utensil embodying the invention.
Figure 2 is a side view of the same.
Figure 3 is an edge view thereof.

The device consists essentially of a blade 10 and a handle 11 of which the latter is attached by rivets 12 or the equivalents thereof to an extended shank or tang 13 of the former, and a coring and stemming head 14 carried by and formed as an extension of the blade.

The handle is preferably formed as a single block which is sawed or kerfed as indicated at 15 to receive the shank or tang of the blade, so that the surface 16 against which the fingers of the hand of the operator bear, and which is convexed or rounded smoothly for that purpose, is unbroken and affords no means whereby the chaffing or objectionable rubbing of the hand may be caused. The upper outer portion of the handle or grip is provided with a deflection or horn 17 to serve as a bearing for the index finger and prevent the slipping of the finger from the handle or grip portion. Also as a further means of preventing injury to the hand of the operator the heel portion 18 of the blade adjacent to the inner end of the handle or grip is transversely flattened or dulled as indicated to form a bearing for the end of the thumb of the operator in manipulating and directing the blade in operation.

The blade is beveled as indicated at 19 to form a paring and splitting edge and the head consists of an abrupt bow which is of trunco-conical form having its opposite edges beveled as indicated at 20 and 21, the free end of the bow being sharply deflected as at 22 to provide a stemming gouge 23. The ear 22 formed by the abruptly deflected portion extends from the angle of the stemming gouge toward the inner surface of the bow formed by the head.

In practice, after the fruit has been split, whether pared or not, to form halves carrying corresponding portions of the core, particularly in the treatment of pears and similar fruit, the half which is retained in the holding hand of the operator should be in a position with the stem directed outwardly or toward the ends of the fingers while the blossom is directed inwardly toward the base of the thumb, whereupon an inward sweeping movement of the head with the convex side thereof directed toward the cut surface of the fruit section, and starting at the base of the stem, will result in cutting out the core without removing any considerable portion of the meat of the fruit, the cutting edge of the bow describing a curved path which is materially facilitated by the conical form of the head. Moreover the enlargement diametrically of the head toward the rear edge serves to release the core which is received thereby so as to readily permit of discharging it from the interior of the head. Again the bevelling of the back or larger edge of the head as well as the front or cutting edge thereof tends to give the head an exterior transversely convexed contour which facilitates the tipping of the head or directing it in a curved path so as to take out the core with the minimum removal of adjacent portions of the meat of the fruit.

Having removed the core a second stroke in the opposite direction with the tool reversed from the position indicated for coring and bringing the edge of the stem gouge into contact with the fruit at the base of the stem will remove the latter together with adjacent portions of the skin of the fruit in the stem socket or bit. It will be understood that in the coring of the fruit the cutting motion of the head is started at the base of the stem and progresses toward the blossom end of the fruit whereas the stemming of the fruit is accomplished by a movement of the stemming gouge in the opposite direction or from the base of the stem toward the stem end of the fruit.

Hence the operation of splitting a pear for example so as to leave one half in the hand of the operator and the subsequent operations of coring and stemming can be accomplished practically without any interval of rest and hence without any such loss of time as is involved in changing implements for the several purposes, and the half of the fruit which has been dropped in the splitting thereof can immediately be grasped to repeat the operations of coring and stemming with the minimum of effort and expenditure of time, to the end that the proper preparation of the fruit for canning purposes may be accomplished by the ordinarily skillful operator in materially less time than is possible under the conditions which at present obtain in the equipment of canning factories.

Having described the invention, what is claimed as new and useful is:—

1. A fruit preparing utensil having a handle carrying paring and splitting blade provided with a terminal coring head consisting of a bow having a terminal V-shaped portion forming a stem gouge.

2. A fruit preparing utensil having a handle carrying paring and splitting blade provided with a terminal coring head consisting of a bow having a terminal inwardly directed ear intersecting the cutting edge of the bow to form a V-shaped stem gouge.

In testimony whereof he affixes his signature.

DANIEL P. STEEPLES.